US012072656B1

United States Patent
(12) United States Patent
Takahashi

(10) Patent No.: US 12,072,656 B1
(45) Date of Patent: Aug. 27, 2024

(54) IMAGE FORMING APPARATUS ABNORMALITY DETECTION

(71) Applicant: TOSHIBA TEC KABUSHIKI KAISHA, Tokyo (JP)

(72) Inventor: Koji Takahashi, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/184,750

(22) Filed: Mar. 16, 2023

(51) Int. Cl.
*G03G 15/00* (2006.01)

(52) U.S. Cl.
CPC ......... *G03G 15/55* (2013.01); *G03G 15/5016* (2013.01)

(58) Field of Classification Search
USPC ........................................................... 399/26
See application file for complete search history.

(56) References Cited

U.S. PATENT DOCUMENTS

2004/0258424 A1 12/2004 Sawada
2007/0003300 A1 * 1/2007 Takahashi .......... G03G 15/5037 399/66

FOREIGN PATENT DOCUMENTS

JP 1990-073671 6/1990
JP 2022-20930 2/2022

* cited by examiner

*Primary Examiner* — Quana Grainger
(74) *Attorney, Agent, or Firm* — Amin, Turocy & Watson, LLP

(57) ABSTRACT

According to one embodiment, an image forming apparatus includes an image bearing member, a charging roller, an exposure unit, a developing device, a transfer roller, and a control unit. The charging roller charges the image bearing member. The exposure unit forms an electrostatic latent image on the surface of the image bearing member. The developing device develops the electrostatic latent image formed on the surface of the image bearing member into a toner image. The transfer roller transfers the toner image from the image bearing member. The control unit detects a resistance detection voltage of the transfer roller as a voltage for detecting that there is an abnormality in the image bearing member.

23 Claims, 5 Drawing Sheets

IMAGE FORMING APPARATUS ABNORMALITY DETECTION

FIELD

Embodiments described herein relate generally to an image forming apparatus and methods related thereto.

BACKGROUND

In the related art, an image forming apparatus is known, which employs a charging roller system that charges an image bearing member using a charging roller. However, in such an image forming apparatus, a photosensitive layer of the image bearing member is worn away and thinned due to contact with the charging roller. This thinning of the photosensitive layer of the image bearing member increases leakage current from the charging roller to a photoreceptor tube, which may cause a drop in the voltage applied to the charging roller. For this reason, the image forming apparatus may cause a drop in the voltage applied to the charging roller due to thinning of the photosensitive layer of the image bearing member, resulting in lowered surface potential of the image bearing member and subsequently, white background fogging and the like.

DETAILED DESCRIPTION

Figure 1:
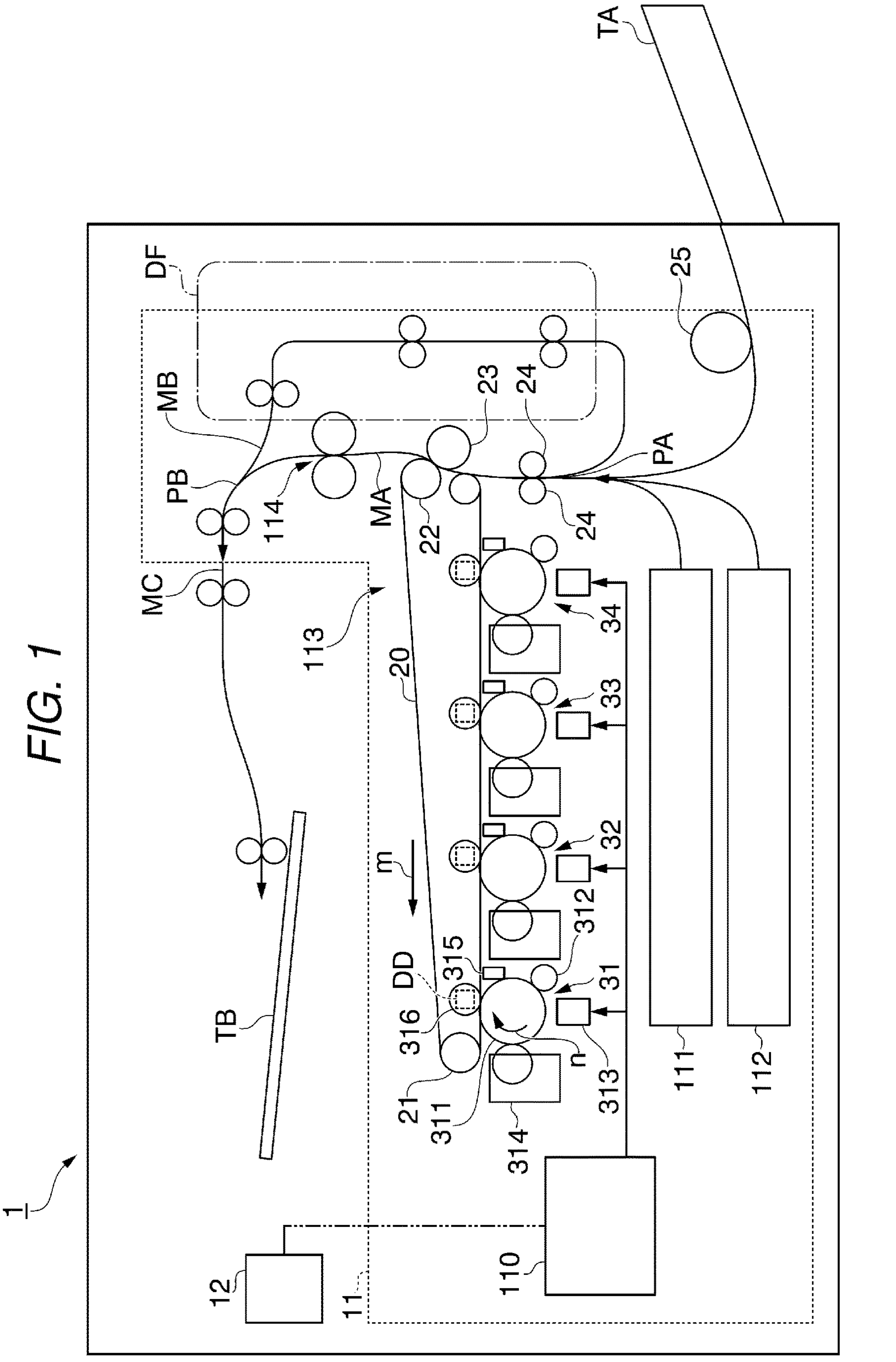
FIG. 1 is a diagram showing an example of a configuration of an image forming apparatus according to an embodiment.

In general, according to one embodiment, an image forming apparatus will be described with reference to the drawings. In each drawing, the same configurations are denoted by the same reference numerals. An image forming apparatus 1 will be described as an example of an image forming apparatus according to an embodiment. In the embodiment, if a voltage is referred to, it means a potential difference from a predetermined reference potential, and illustration and description of the reference potential are omitted. Any potential may be used as the reference potential. As an example, an example where the reference potential is the ground potential will be described. According to another embodiment, a method for an image forming apparatus involves charging an image bearing member with a charging roller; forming an electrostatic latent image on a surface of the image bearing member; developing the electrostatic latent image formed on the surface of the image bearing member into a toner image; transferring a toner image from the image bearing member with a transfer roller; and detecting a resistance detection voltage of the transfer roller as a voltage for indicating that an abnormality exists in the image bearing member.

(Configuration of Image Forming Apparatus)

The configuration of the image forming apparatus 1 will be described with reference to FIG. 1. FIG. 1 is a diagram showing an example of the configuration of the image forming apparatus 1 according to the embodiment.

The image forming apparatus 1 is an apparatus configured to form an image on a print medium. For example, the image forming apparatus 1 is a multifunction machine, a copier, a printer, or the like. The image forming apparatus 1 is provided in a workplace, for example. A print medium is a medium on which process such as image formation is performed by the image forming apparatus 1. The print medium may be any sheet-like medium capable of forming an image on at least one of its two sides. For example, the print medium is printing paper, plastic film, or the like.

The image forming apparatus 1 identifies the type of print medium on which a process desired by the user is performed, in response to an operation received from the user. The print medium is classified according to the size, thickness, material and the like of the print medium.

The image forming apparatus 1 forms a toner image of an image on the print medium of the type specified in advance, in response to the operation received from the user. After forming the toner image of the image on the print medium, the image forming apparatus 1 heats the print medium to fix the toner image of the image onto the print medium as an image.

For example, the image forming apparatus 1 includes a printer unit 11, a control panel 12, a manual feed tray TA, and a paper discharge tray TB. The image forming apparatus 1 may be configured to include other members, other devices, and the like, in addition to the printer unit 11, the control panel 12, the manual feed tray TA, and the paper discharge tray TB.

The printer unit 11 includes a control unit 110, a paper feed cassette 111, a paper feed cassette 112, an image forming unit 113 and a fixing device 114. The printer unit 11 may be configured to include other members, other devices, and the like, in addition to the control unit 110, the paper feed cassette 111, the paper feed cassette 112, the image forming unit 113, and the fixing device 114. The image forming unit 113 may be configured to include the fixing device 114.

The control unit 110 controls the overall operation of the image forming apparatus 1. In other words, the control unit 110 controls the printer unit 11, the control panel 12, the image forming unit 113, and the fixing device 114, respectively.

The paper feed cassette 111 accommodates a type of print media desired by the user.

The paper feed cassette 112 accommodates a type of print media desired by the user.

The control panel 12 includes an operation reception unit and a display unit.

The operation reception unit receives an operation from the user. The operation reception unit is an input device such as a touch pad, and input keys. The operation reception unit outputs, to the control unit 110, information indicating the operation received from the user.

The display unit displays an image in response to an operation received via the operation reception unit. The display unit is an image display device such as a liquid crystal display, or an organic Electro Luminescence (EL) display. It is to be noted that the display unit may be configured integrally with the operation reception unit as a touch panel.

The image forming unit 113 conveys the print medium and forms a toner image on the print medium under the control of the control unit 110. This toner image is the toner image of the image indicated by the image data acquired from the control unit 110. The configuration of the image forming unit 113 will be described below.

The fixing device 114 fixes the toner image formed on the print medium by the image forming unit 113 onto the print medium as an image. The fixing device 114 includes a plurality of heating elements (not shown). The plurality of heating elements are objects that generate heat when energized, and, for example, include resistive elements and the like having a predetermined electrical resistance.

The fixing device 114 heats the print medium by heating at least some of the plurality of heating elements under the control of the control unit 110. As a result, the fixing device 114 can fix the toner image formed on the print medium by the image forming unit 113 onto the print medium as an image.

For convenience of explanation, forming the toner image on the print medium and fixing the toner image onto the print medium as an image by heating the print medium will be referred to as printing.

(Configuration of Image Forming Unit)

The configuration of the image forming unit 113 will be described below.

The image forming unit 113 includes an intermediate transfer belt 20. The image forming unit 113 includes a driven roller 21, a backup roller 22, a secondary transfer roller 23, two registration rollers 24 and a manual feed roller 25. The image forming unit 113 includes four sets of image forming stations including an image forming station 31, an image forming station 32, an image forming station 33, and an image forming station 34. The image forming unit 113 includes a double-sided printing device DF.

The intermediate transfer belt 20 is a belt onto which a toner image is primarily transferred by the four sets of image forming stations. The intermediate transfer belt 20 is supported by the driven roller 21, the backup roller 22, and the like. The intermediate transfer belt 20 rotates in the direction indicated by the arrow m in FIG. 1. More specifically, the image forming unit 113 rotates the intermediate transfer belt 20 in the corresponding direction by a motor (not shown) under the control of the control unit 110.

The image forming station 31 is an image forming station for forming a Y (yellow) image. The image forming station 32 is an image forming station for forming an M (magenta) image. The image forming station 33 is an image forming station for forming a C (cyan) image. The image forming station 34 is an image forming station for forming a K (black) image. In the image forming unit 113, these four sets of image forming stations are arranged along the rotation direction of the intermediate transfer belt 20 below the intermediate transfer belt 20.

The image forming station 31 includes the photosensitive drum 311, a charging roller 312, an exposure scanning head 313, a developing device 314, a photosensitive cleaner 315 and a primary transfer roller 316. In the image forming station 31, the charging roller 312, the exposure scanning head 313, the developing device 314, the photosensitive cleaner 315, and the primary transfer roller 316 are arranged around the photosensitive drum 311 that rotates in the direction indicated by the arrow n in FIG. 1.

The charging roller 312 charges the photosensitive drum 311.

The exposure scanning head 313 forms an electrostatic latent image on the photosensitive drum 311. For example, the surface of the photosensitive drum 311 is a photosensitive layer of the photosensitive drum 311, but is not limited thereto.

The developing device 314 develops the electrostatic latent image formed on the surface of the photosensitive drum 311 into a toner image.

The toner image developed on the surface of the photosensitive drum 311 is transferred onto the intermediate transfer belt 20.

The primary transfer roller 316 faces the photosensitive drum 311 with the intermediate transfer belt 20 interposed therebetween. In other words, the primary transfer roller 316 faces the photosensitive drum 311 with the intermediate transfer belt 20 interposed therebetween. For example, the primary transfer roller 316 is a roller made of resin such as rubber. The primary transfer roller 316 may be a roller made of other material such as metal.

The primary transfer roller 316 is provided with a constant current source (not shown) and a detection unit DD.

For example, the constant current source is a power supply circuit that supplies a predetermined constant current between the primary transfer roller 316 and the photosensitive drum 311 under the control of the control unit 110. The constant current is a current value equal to or higher than a current value required for primary transfer. The constant current source supplies voltages of opposite polarities to the primary transfer roller 316 and the charging roller 312, respectively, and supplies the constant current between the primary transfer roller 316 and the photosensitive drum 311. The constant current source may be any circuit as long as it is capable of supplying the constant current between the primary transfer roller 316 and the photosensitive drum 311. Instead of the power supply circuit, the constant current source may be a power supply device that supplies the constant current between the primary transfer roller 316 and the photosensitive drum 311 under the control of the control unit 110. The constant current source may be configured integrally with the primary transfer roller 316 or may be configured separately from the primary transfer roller 316. The constant current source may be provided at any position as long as it is capable of supplying the constant current between the primary transfer roller 316 and the photosensitive drum 311.

The detection unit DD is a voltage detection circuit configured to monitor whether an appropriate voltage is applied between the primary transfer roller 316 and the photosensitive drum 311 during a pre-rotation of rotating the photosensitive drum 311 before the primary transfer. Specifically, the detection unit DD is a circuit configured to detect a resistance detection voltage that is used to detect the resistance value of the resistor, if both the primary transfer roller 316 and the intermediate transfer belt 20 are treated as one resistor. The detection unit DD may be any circuit as long as it is capable of detecting the resistance detection voltage. The detection unit DD may be a voltage detection device capable of detecting the resistance detection voltage under the control of the control unit 110 instead of the voltage detection circuit. The detection unit DD may be configured integrally with the primary transfer roller 316 or may be configured separately from the primary transfer roller 316. The detection unit DD may be provided at any position as long as it is capable of detecting the resistance detection voltage of the resistor. The detection unit DD may be configured separately from the image forming apparatus 1. In this case, the detection unit DD is connected to the image forming apparatus 1 from outside the image forming apparatus 1.

The detection unit DD is controlled by the control unit 110. The detection unit DD detects a resistance detection voltage generated by a constant current supplied from a constant current source from the primary transfer roller 316 to the photosensitive drum 311 via the intermediate transfer belt 20. The detection unit DD outputs resistance detection voltage information indicating the detected resistance detection voltage to the control unit 110. Accordingly, the image forming apparatus 1 can monitor whether an appropriate voltage is applied between the primary transfer roller 316 and the photosensitive drum 311 if primary transfer is performed. For example, if the resistance detection voltage is lower than the appropriate voltage, the control unit 110 controls the constant current source to increase the voltage applied to the primary transfer roller 316 to a proper voltage. In addition, for example, if the resistance detection voltage is higher than the appropriate voltage, or if the resistance detection voltage is lower than the appropriate voltage, the control unit 110 controls the constant current source and adjusts voltages applied to the primary transfer roller 316 and the charging roller 312 respectively. Accordingly, the control unit 110 can apply an appropriate voltage between the primary transfer roller 316 and the photosensitive drum 311 if the primary transfer is performed.

The image forming station 32, the image forming station 33, and the image forming station 34 each have the same configuration as the image forming station 31 described above. Therefore, descriptions of the configurations of the image forming station 32, the image forming station 33, and the image forming station 34 are omitted below.

The secondary transfer roller 23 faces the backup roller 22 with the intermediate transfer belt 20 interposed therebetween. The secondary transfer roller 23 secondarily transfers the toner image that is primarily transferred onto the intermediate transfer belt 20, onto a print medium passing between the secondary transfer roller 23 and the intermediate transfer belt 20.

The two registration rollers 24 convey the print medium picked up from the paper feed cassette 111, the paper feed cassette 112, and the manual feed tray TA by a conveyance mechanism (not shown), to between the secondary transfer roller 23 and the intermediate transfer belt 20.

The manual feed roller 25 picks up the print medium from the manual feed tray TA and conveys the picked-up print medium to the two registration rollers 24.

The print medium with the toner image secondarily transferred thereto by the secondary transfer roller 23 is conveyed to the fixing device 114 where the toner image is formed onto the print medium as an image. The fixing device 114 fixes the toner image, which has been secondarily transferred to the print medium, onto the print medium as an image while conveying the print medium with the rollers. As a result, the image is formed on the print medium.

The double-sided printing device DF is a device configured to convey the print medium formed with the image on its surface by the fixing device 114 to the two registration rollers 24. The print medium with its front and back sides reversed is conveyed to the double-sided printing device DF. Therefore, the print medium conveyed between the two registration rollers 24 via the double-sided printing device DF has an image formed on the back side via the secondary transfer roller 23 and the fixing device 114.

(Operation of Image Forming Unit)

Hereinafter, the operation of the image forming unit 113 will be described.

First, the operation of the four sets of image forming stations will be described by taking the operation of the image forming station 31 as an example.

The image forming station 31 charges the photosensitive drum 311 with the charging roller 312 and then exposes the drum 311 with the exposure scanning head 313. Accordingly, the image forming station 31 forms an electrostatic latent image on the photosensitive drum 311. Then, the image forming station 31 causes the developing device 314 to develop the electrostatic latent image formed on the surface of the photosensitive drum 311. The developing device 314 develops the electrostatic latent image on the photosensitive drum 311 into a toner image using a two-component developer formed of toner and carrier. The primary transfer roller 316 primarily transfers the toner image formed on the photosensitive drum 311 onto the intermediate transfer belt 20. After this primary transfer is performed, the photosensitive cleaner 315 removes toner remaining on the photosensitive drum 311.

Each of the image forming station 31, the image forming station 32, the image forming station 33, and the image forming station 34 forms a color toner image on the intermediate transfer belt 20 by the primary transfer roller 316. A color toner image is formed by sequentially superimposing Y (yellow), M (magenta), C (cyan), and K (black) toner images.

Next, the operation of the secondary transfer roller 23 will be described. The secondary transfer roller 23 secondarily transfers, collectively, the color toner images on the intermediate transfer belt 20 onto a print medium passing between the secondary transfer roller 23 and the intermediate transfer belt 20. In the following description, the term "toner image" may refer to either a color toner image or a uni-color toner image. The toner image may be a toner image using decolorable toner.

Next, the operation of conveying the print medium of the operations of the image forming unit 113 will be described.

A print medium picked up from the paper feed cassette 111, the paper feed cassette 112, and the manual feed tray TA is fed into a nip of the two registration rollers 24 by the conveyance mechanism (not shown). As a result, the leading edge of the print medium is aligned. Then, the two registration rollers 24 convey the print medium between the secondary transfer roller 23 and the intermediate transfer belt 20 in accordance with the timing at which the image forming unit 113 transfers the toner image onto the print medium. The conveyance paths along which the print media picked up from the paper feed cassette 111, the paper feed cassette 112, and the manual feed tray TA are conveyed to the two registration rollers 24 join at a confluence portion PA shown in FIG. 1.

In the image forming unit 113, three conveyance paths of a conveyance path MA, a conveyance path MB, and a conveyance path MC are formed by the two registration rollers 24, the fixing device 114, and a plurality of rollers in the double-sided printing device DF. The conveyance path MA is a conveyance path from the confluence portion PA to a branch portion PB shown in FIG. 1. The conveyance path MB is a conveyance path that passes through the double-sided printing device DF, and is a conveyance path from the branch portion PB to the confluence portion PA. The conveyance path MC is a conveyance path from the branch portion PB to the paper discharge tray TB.

The two registration rollers 24 start rotating in alignment with the position of the toner image on the rotating intermediate transfer belt 20 and move the print medium to the position of the secondary transfer roller 23. As a result, the toner image formed on the intermediate transfer belt 20 is secondarily transferred onto the print medium by the secondary transfer roller 23. After the toner image is secondarily transferred to the print medium, the secondary transfer roller 23 conveys the print medium to the fixing device 114 along the conveyance path MA. The fixing device 114 fixes the toner image, which has been secondarily transferred onto the print medium conveyed from the secondary transfer roller 23, onto the print medium as an image while conveying the print medium. As a result, the secondarily transferred toner image is formed on the print medium as an image. After the image is formed on the print medium, the fixing device 114 conveys the print medium to the conveyance path MC. Then, the print medium conveyed to the conveyance path MC is discharged by the rollers (not shown).

In the case of double-sided printing, after an image is formed on the front side and the whole print medium is passed through the branch portion PB, the rollers (not shown) switch back to convey the print medium to the conveyance path MB. As a result, the front and back sides of the print medium are reversed. Then, a plurality of rollers in the double-sided printing device DF convey the print medium to the nip of the two registration rollers 24 along the conveyance path MB. Then, the print medium with the front and back sides reversed is conveyed along the conveyance path MA via the two registration rollers 24, and the toner image is fixed as an image by the fixing device 114. As a result, an image is also formed on the back side of the print medium. The fixing device 114 conveys the print medium with the image formed on the back side to the conveyance path MC, and discharges the print medium. The image formed on the front side of the print medium and the image formed on the back side of the print medium may be different images or the same image.

As described above, the secondary transfer roller 23, the two registration rollers 24, the fixing device 114, and various rollers in the double-sided printing device DF form a conveying unit for conveying the print medium in the image forming apparatus 1.

The image forming apparatus 1 configured as described above charges the photosensitive drum 311 using the charging roller 312 in each of the four sets of image forming stations described above. Therefore, in the image forming apparatus 1, the photosensitive layer of the photosensitive drum 311 may wear away and be thinned due to contact with the charging roller 312. This thinning of the photosensitive drum 311 of the image bearing member increases leakage current from the charging roller 312 to the photoreceptor tube of the photosensitive drum 311, which may cause a drop in the voltage applied to the charging roller 312. As a result, the thinning may cause white background fogging due to a decrease in the surface potential of the photosensitive drum 311 in the image forming apparatus 1. In addition to this, the thinning causes concentration of current at the location where leakage current is generated, which may decrease the pressure resistance at the opposing location on the charging roller 312, and cause a significant decrease in electrical resistance. This is not desirable because it causes periodic color spots, fogging, and the like, and accelerates deterioration of the charging roller 312. As a method for solving such a problem, a method of determining whether there is an abnormality in the photosensitive drum 311 due to a current flowing from the charging roller 312 to the photosensitive drum 311 is known. However, it is also known that the relationship between the current and the surface state of the photosensitive drum 311 changes according to the usage history of the image forming apparatus 1, the environment in which the image forming apparatus 1 is installed, and the like. Therefore, with this method, it may not be possible to accurately determine whether there is an abnormality in the photosensitive drum 311.

Therefore, the image forming apparatus 1 detects the resistance detection voltage of the resistor described above as a voltage for detecting if there is an abnormality in the photosensitve drum 311. As a result, the image forming apparatus 1 can accurately determine that there is an abnormality in the photosensitive drum 311. In the present embodiment, in the process performed by the image forming apparatus 1, the process of determining if there is an abnormality in the photosensitive drum 311 based on the resistance detection voltage will be described in detail. For convenience of explanation, this process will be referred to as an abnormality determination process.

(Functional Configuration of Control Unit)

Figure 2:
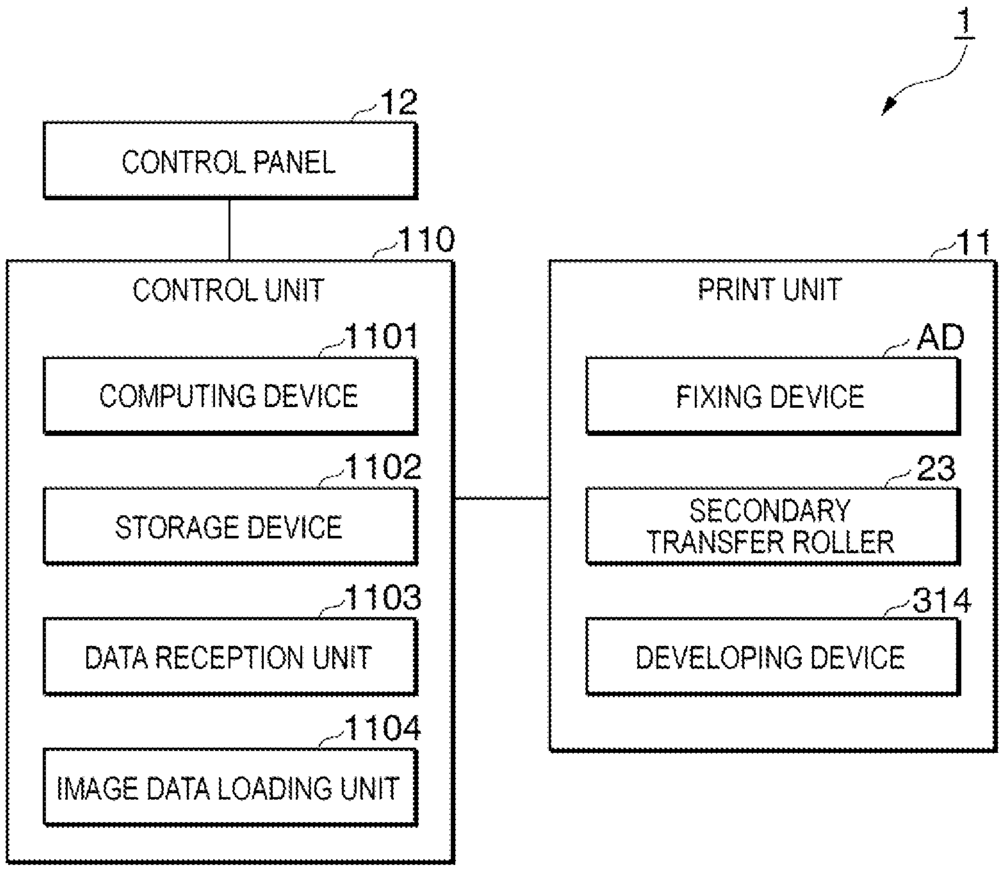
FIG. 2 is a diagram showing an example of a functional configuration of a control unit.

Next, the functional configuration of the control unit 110 will be described with reference to FIG. 2. FIG. 2 is a diagram showing an example of the functional configuration of the control unit 110.

As shown in FIG. 2, the control unit 110 is communicatively connected to each of the printer unit 11 and the control panel 12. The control unit 110 includes a computing device 1101, a storage device 1102, a data reception unit 1103 and an image data loading unit 1104.

An example of the computing device 1101 includes a Central Processing Unit (CPU), an Application Specific Integrated Circuit (ASIC), or the like. The computing device 1101 controls the printer unit 11 and the control panel 12 respectively, according to an image process program stored in the storage device 1102.

The storage device 1102 is Read Only Memory (ROM), Random Access Memory (RAM), Hard Disk Drive (HDD), Solid State Drive (SSD), or the like. The storage device 1102 may be separate from the control unit 110.

The data reception unit 1103 receives print data representing an image to be printed (e.g., data described in a page description language and the like) from a host such as a personal computer (PC), and stores the received print data in the storage device 1102.

By determining the print conditions from the print data that is stored in the storage device 1102 by the data reception unit 1103, the image data loading unit 1104 loads the data into data that can be printed by the printer unit 11 (for example, raster data), and stores the data in the storage device 1102.

(Thinning of Photosensitive Layer of Photosensitive Drum and Change in Photosensitive Surface Voltage)

Figure 3:
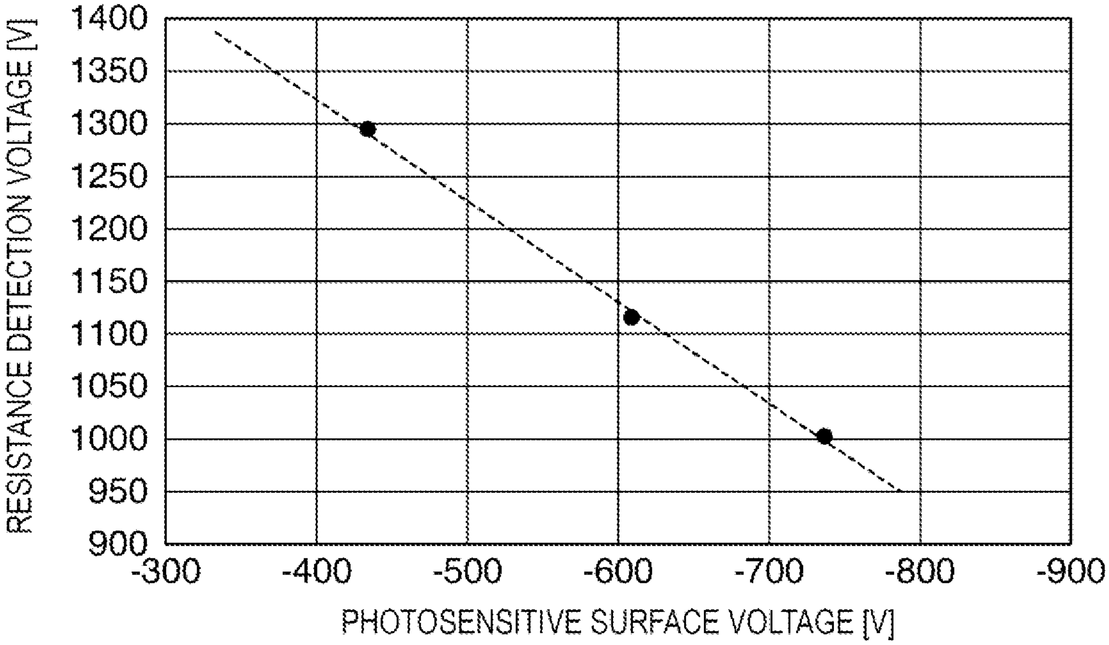
FIG. 3 is a diagram showing an example of a correlation between a resistance detection voltage and a photosensitive surface voltage.

As described above, the image forming apparatus 1 detects the resistance detection voltage by the detection unit DD. The photosensitive surface voltage is the voltage on the surface of the photosensitive drum 311. The detected resistance detection voltage is correlated with the photosensitive surface voltage as shown in FIG. 3. This is because the constant current source causes a constant current to flow between the primary transfer roller 316 and the photosensitive drum 311 by applying voltages of opposite polarities to the primary transfer roller 316 and charging roller 312, respectively, in response to the resistance value of the resistor. FIG. 3 is a diagram showing an example of a correlation between the resistance detection voltage and the photosensitive surface voltage. The horizontal axis of the graph shown in FIG. 3 represents the photosensitive surface voltage. The vertical axis of the graph represents the resistance detection voltage. As shown in FIG. 3, the resistance detection voltage linearly decreases as the photosensitive surface voltage decreases. This is because the constant current source keeps the potential difference between the voltage applied to the primary transfer roller 316 and the voltage applied to the charging roller 312 substantially constant in order to flow the constant current between the primary transfer roller 316 and the photosensitive drum 311. The image forming apparatus 1 can detect the change in the photosensitive surface voltage based on the change in the detected resistance detection voltage using the correlation shown in FIG. 3.

Meanwhile, the photosensitive surface voltage changes periodically according to the state of the photosensitive layer of the photosensitive drum 311 each time the photosensitive drum 311 is rotated once. This is because, as described above, the leakage current flowing from the photosensitive layer of the photosensitive drum 311 to the photoreceptor tube of the photosensitive drum 311 increases as the thinning of the photosensitive layer of the photosensitive drum 311 progresses.

Figure 4:
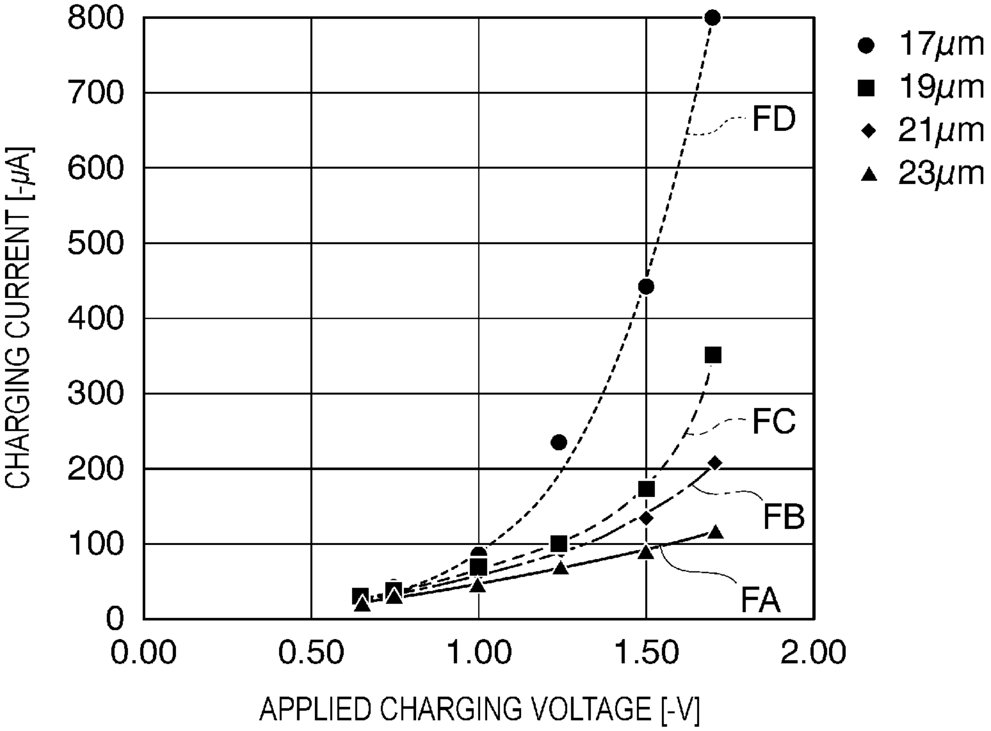
FIG. 4 is a diagram showing a relationship between an applied charging voltage and a charging current changing in response to a progress of thinning of a photosensitive layer of a photosensitive drum.

FIG. 4 is a diagram showing a relationship between an applied charging voltage and a charging current that change in response to the progress of the thinning of the photosensitive layer of the photosensitive drum 311. The applied charging voltage is the voltage applied to the charging roller 312. The charging current is a current flowing from the charging roller 312 to the photosensitive drum 311 if the constant current source applies a voltage to each of the primary transfer roller 316 and the charging roller 312 such that a constant current flows from the photosensitive drum 311 to the primary transfer roller 316. The charging current increases as the leakage current described above increases. The horizontal axis of the graph shown in FIG. 4 represents the applied charging voltage. The vertical axis of the graph represents charging current. The curve FA shown in FIG. 4 shows an example of the relationship between the applied charging voltage and the charging current if the thickness of the photosensitive layer is 23 μm. The curve FB shown in FIG. 4 shows an example of the relationship between the applied charging voltage and the charging current if the thickness of the photosensitive layer is 21 μm. The curve FC shown in FIG. 4 shows an example of the relationship between the applied charging voltage and the charging current if the thickness of the photosensitive layer is 19 μm. The curve FD shown in FIG. 4 shows an example of the relationship between the applied charging voltage and the charging current if the thickness of the photosensitive layer is 17 μm. Comparing the curves FA-FD shows that as the thinning of the photosensitive layer progresses, the increasing aspect of the charging current is steeper with increasing applied charging voltage. This indicates that the leakage current increases as the thinning of the photosensitive layer progresses. If the leakage current is increased, as shown in FIG. 5, it is difficult to increase the photosensitive surface voltage even if the applied charging voltage is increased.

Figure 5:
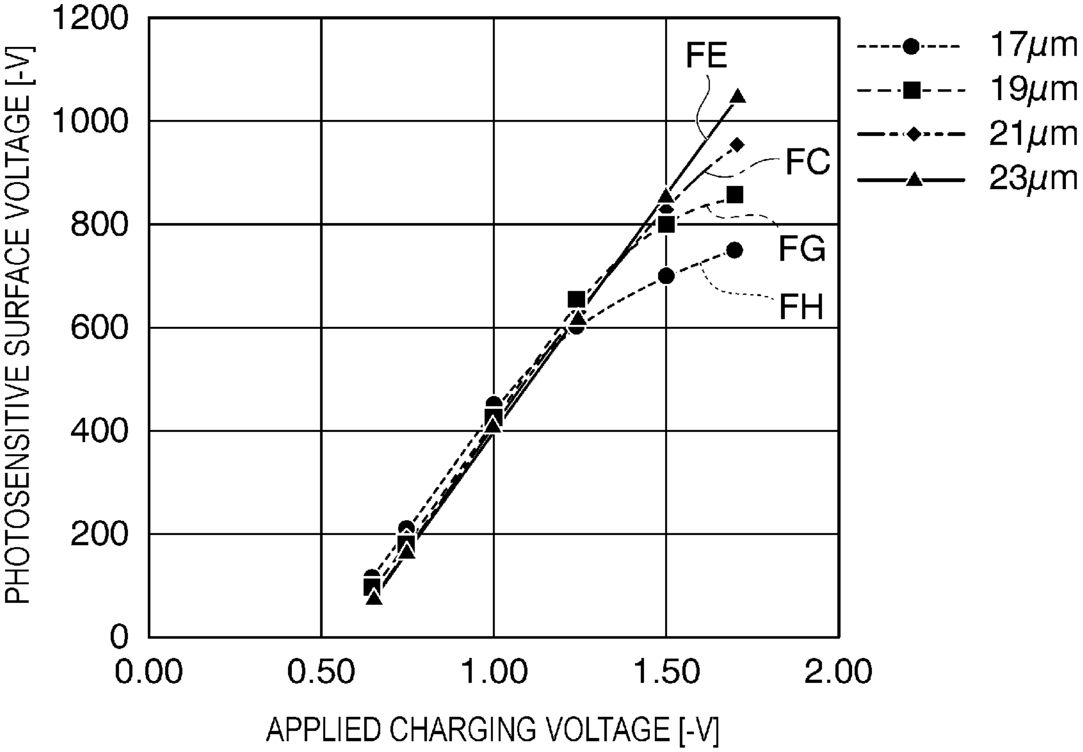
FIG. 5 is a diagram showing a relationship between the applied charging voltage and the photosensitive surface voltage changing in response to the progress of thinning of the photosensitive layer of the photosensitive drum.

FIG. 5 is a diagram showing a relationship between the applied charging voltage and the photosensitive surface voltage changing in response to the progress of thinning of the photosensitive layer of the photosensitive drum 311. The horizontal axis of the graph shown in FIG. 5 represents the applied charging voltage. The vertical axis of the graph represents the photosensitive surface voltage if the constant current source applies a voltage to each of the primary transfer roller 316 and the charging roller 312 such that a constant current flows from the photosensitive drum 311 to the primary transfer roller 316. The curve FE shown in FIG. 5 shows an example of the relationship between the applied charging voltage and the photosensitive surface voltage if the thickness of the photosensitive layer is 23 μm. The curve FF shown in FIG. 5 shows an example of the relationship between the applied charging voltage and the photosensitive surface voltage if the thickness of the photosensitive layer is 21 μm. The curve FG shown in FIG. 5 shows an example of the relationship between the applied charging voltage and the photosensitive surface voltage if the thickness of the photosensitive layer is 19 μm. The curve FH shown in FIG. 5 shows an example of the relationship between the applied charging voltage and the photosensitive surface voltage if the thickness of the photosensitive layer is 17 μm. Comparing the curves FE-FH shows that as the thinning of the photosensitive layer progresses, the increasing aspect of the photosensitive surface voltage is smoother with increasing applied charging voltage. This indicates that the photosensitive surface voltage is less likely to increase due to the increase in leakage current described above.

As described above, as the thinning of the photosensitive layer of the photosensitive drum 311 progresses, the photosensitive surface voltage tends to decrease. Such circumstances are the same if scratches are formed on the photosensitive layer. That is, the photosensitive surface voltage changes periodically according to the state of the photosensitive layer of the photosensitive drum 311 each time the photosensitive drum 311 is rotated once. Using this, the image forming apparatus 1 detects a resistance detection voltage correlated with the photosensitive surface voltage, and determines whether there is an abnormality in the photosensitive drum 311 based on the detected resistance detection voltage.

(Abnormality Determination Process)

Figure 6:
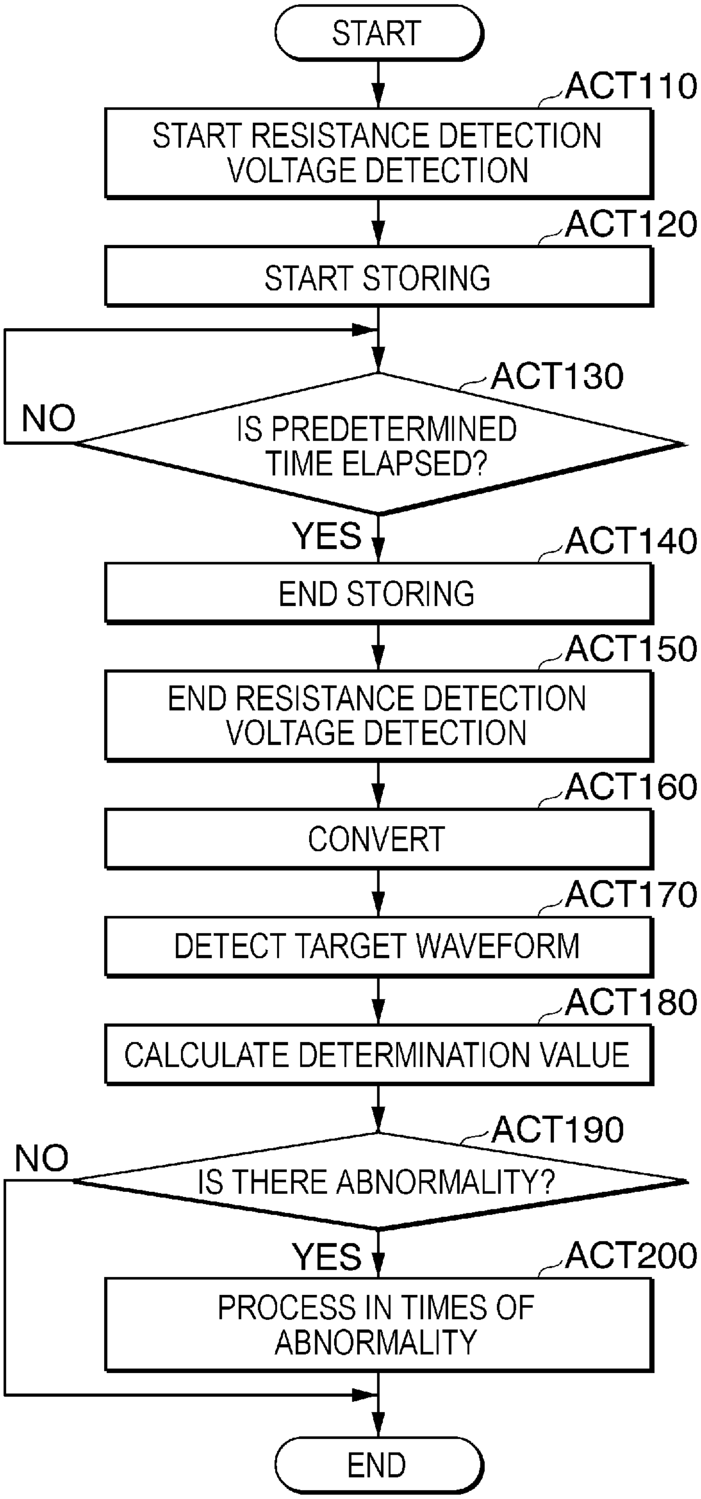
FIG. 6 is a diagram showing an example of flow of an abnormality determination process for an image forming station.

The abnormality determination process for the image forming station 31 will be described with reference to FIG. 6. FIG. 6 is a diagram showing an example of a flow of the abnormality determination process for the image forming station 31. The flow of abnormality determination process for each of the image forming stations 32 to 34 is the same as the flow of abnormality determination process shown in FIG. 6. Therefore, in this embodiment, redundant description of the flow of abnormality determination process for each of the image forming stations 32 to 34 will be omitted.

The image forming apparatus 1 repeats the process of the flowchart shown in FIG. 6 each time a predetermined determination condition is satisfied. As an example, a situation will be described below, in which the determination condition corresponds to a start of a post-rotation of rotating the photosensitive drum 311 after the primary transfer. Alternatively, the determination condition may be any condition as long as this can be used as a trigger for starting the abnormality determination process. The determination conditions may be different from each other or the same as each other in the abnormality determination process for some or all of the image forming stations 31 to 34.

If it is determined that the determination condition is satisfied, the control unit 110 controls the constant current source described above to start supplying a constant current from the photosensitive drum 311 to the primary transfer roller 316 via the intermediate transfer belt 20. Then, the control unit 110 controls the detection unit DD to start detecting the voltage across the resistor described above as the resistance detection voltage (ACT 110). In FIG. 6, the process of ACT 110 is indicated by "START RESISTANCE DETECTION VOLTAGE DETECTION." In ACT 110, the constant current source applies the voltage that was applied to the primary transfer roller 316 during the primary transfer to the charging roller 312, and applies the voltage that was applied to the charging roller 312 during the primary transfer to the primary transfer roller 316. As a result, the constant current source can supply a constant current having the same current value as the constant current supplied during the primary transfer from the photosensitive drum 311 to the primary transfer roller 316 via the intermediate transfer belt 20. If the primary transfer roller 316 is made of metal, in ACT 110, the control unit 110 detects, as the resistance detection voltage, the voltage across the intermediate transfer belt 20 between the primary transfer roller 316 and the photosensitive drum 311 instead of the voltage across the resistor.

Then, the control unit 110 starts storing the resistance detection voltage information indicating the resistance detection voltages by the detection started in ACT 110 to the storage device 1102 in chronological order (ACT 120). In FIG. 6, the process of ACT 120 is indicated by "START STORING."

Then, the control unit 110 waits until a predetermined time elapses (ACT 130). As a result, the image forming apparatus 1 can continuously detect the resistance detection voltage described above until the predetermined time elapses. The predetermined time varies in response to the determination conditions. For example, if the determination condition corresponds to the start of the post-rotation of rotating the photosensitive drum 311 after the primary transfer, the predetermined time is shorter than the time from the start of the post-rotation to the end of the post-rotation, and the predetermined time may be any time as long as it is equal to or longer than the time required for the photosensitive drum 311 to make at least one rotation.

If it is determined that the predetermined time elapsed (ACT140—YES), the control unit 110 ends storing the resistance detection voltage information to the storage device 1102, which is the operation started in ACT120 (ACT140).

Then, the control unit 110 controls the detection unit DD to end the resistance detection voltage detection which is the operation started in ACT110 (ACT150). At this time, the control unit 110 controls the constant current source, and ends the supply of current between the primary transfer roller 316 and the photosensitive drum 311. In FIG. 6, the process of ACT 150 is indicated by "END RESISTANCE DETECTION VOLTAGE DETECTION."

Then, the control unit 110 converts the resistance detection voltage indicated by each of the resistance detection voltage information stored in the storage device 1102 in chronological order into a photosensitive surface voltage (ACT 160). In FIG. 6, the process of ACT 160 is indicated by "CONVERT." As described above, the photosensitive surface voltage is correlated with the resistance detection voltage. The control unit 110 performs the conversion in the process of ACT 160 based on correlation information indicating the correlation between the resistance detection voltage and the photosensitive surface voltage. The correlation information is information in which the resistance detection voltage and the photosensitive surface voltage are associated with each other with respect to each of different resistance detection voltages, if the constant current source supplies a constant current between the primary transfer roller 316 and the photosensitive drum 311. The correlation information can be obtained by prior experiments, simulations, and the like, for example. For example, the correlation information is stored in advance in the storage device 1102.

Figure 7:
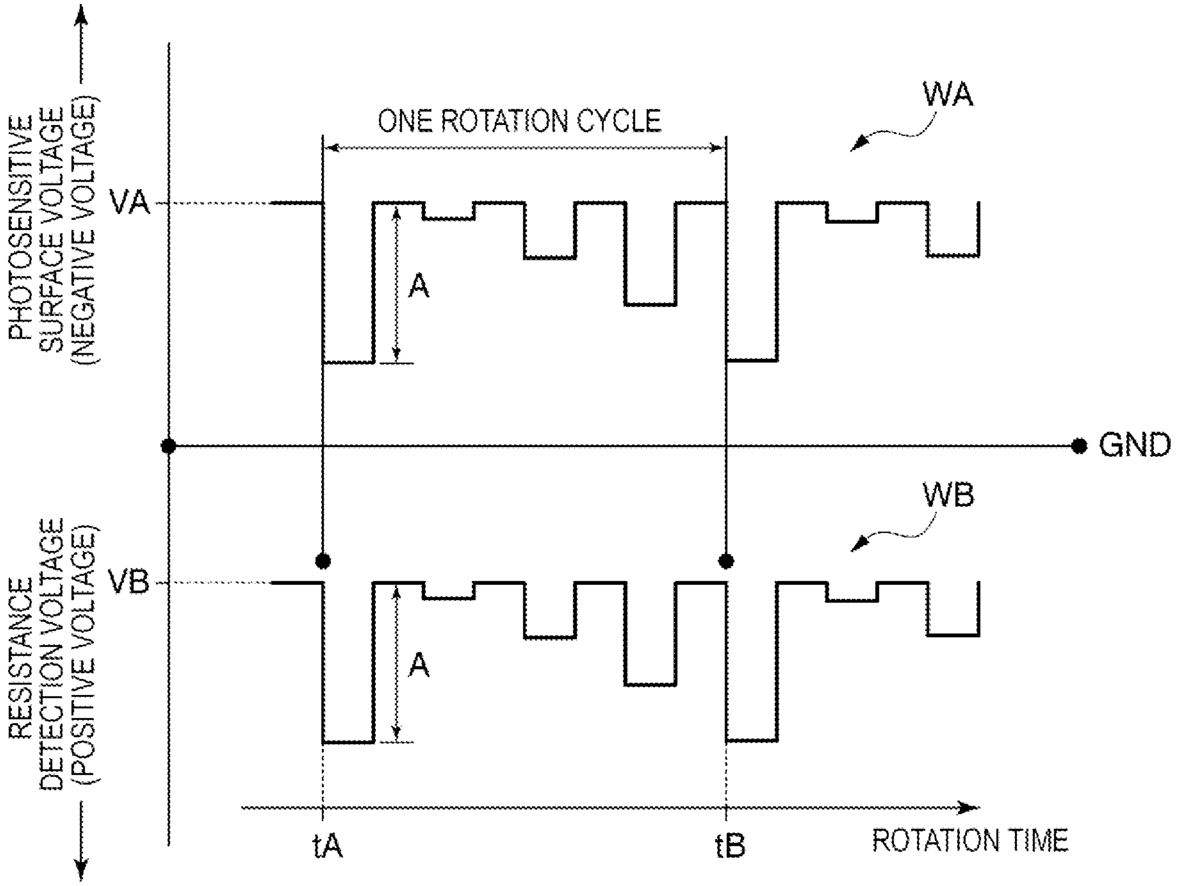
FIG. 7 is a diagram exemplifying waveforms showing changes in the resistance detection voltage together with waveforms showing changes in the photosensitive surface voltage.

Then, the control unit 110 detects, as a target waveform, a waveform indicating a temporal change in photosensitive surface voltage based on the photosensitive surface voltage converted in ACT 160 (ACT 170). FIG. 7 is a diagram showing waveforms showing changes in the resistance detection voltage together with waveforms showing changes in the photosensitive surface voltage. The horizontal axis of the graph shown in FIG. 7 represents the rotation time of the photosensitive drum 311, that is, the elapsed time in the period during which the photosensitive drum 311 is rotated. The vertical axis of the graph represents voltage. In FIG. 7, the portion of the vertical axis of the graph above the ground potential (GND), which is the origin, represents the negative voltage. In FIG. 7, the portion of the vertical axis of the graph below the ground potential (GND), which is the origin, represents the positive voltage. The waveform WA shown in FIG. 7 is an example of the target waveform, and represents temporal changes in the photosensitive surface voltage. The waveform WB shown in FIG. 7 represents a temporal change in the resistance detection voltage. As shown in FIG. 7, the temporal change in the photosensitive surface voltage and the temporal change in the resistance detection voltage are synchronized with each other. As described above, if the resistance value of the resistor is constant, if a constant current is supplied between the primary transfer roller 316 and the photosensitive drum 311, the potential difference between the resistance detection voltage and the photosensitive surface voltage is constant. Therefore, as shown in FIG. 7, the variation width of the photosensitive surface voltage at a certain timing is substantially equal to the variation width of the resistance detection voltage at that timing except for deviations due to measurement errors and the like. The variation width of the photosensitive surface voltage at the corresponding timing is the absolute value of the difference between the minimum value VA of the photosensitive surface voltage and the voltage value of the photosensitive surface voltage at the corresponding timing. The variation width of the resistance detection voltage at the corresponding timing is the absolute value of the difference between the minimum value VB of the resistance detection voltage and the voltage value of the resistance detection voltage at the corresponding timing. Such waveforms WA and WB are periodic waveforms as shown in FIG. 7. This is because the state of the area facing the primary transfer roller 316 in the area of the surface of the photosensitive drum 311 periodically changes for each rotation of the photosensitive drum 311. In the example shown in FIG. 7, the period between timing tA and timing tB is the duration required for the photosensitive drum 311 to rotate once. The image forming apparatus 1 can use such periodicity to specify the partial waveform for each rotation of the photosensitive drum 311 for each of the waveforms WA and WB. The image forming apparatus 1 can use such periodicity to detect the maximum variation width that is generated repeatedly for each rotation of the photosensitive drum 311 for each of the waveforms WA and WB. The maximum variation width of the waveform WA is the absolute value of the difference between the minimum value VA and the voltage value farthest from the minimum value VA of the voltage values of the photosensitive surface voltage. The maximum variation width of the waveform WA may be referred to as the maximum value of the amplitude of the waveform WA. The maximum variation width of the waveform WB is the absolute value of the difference between the minimum value VB and the voltage value farthest from the minimum value VB of the voltage values of the resistance detection voltage. The maximum variation width of the waveform WB may be referred to as the maximum value of the amplitude of the waveform WB. In the example shown in FIG. 7, the maximum variation width of each of waveform WA and waveform WB is indicated by A. The timing when the variation width of each of the waveforms WA and WB reaches the maximum variation width represents the timing when the area where the photosensitive layer is the thinnest in the areas of the photosensitive layer of the photosensitive drum 311 faces the primary transfer roller 316.

Then, the control unit 110 calculates a determination value indicating whether there is an abnormality in the photosensitive drum 311 based on the target waveform detected in ACT 170 (ACT 180). Specifically, for example, in ACT 180, the control unit 110 uses the periodicity of the target waveform to identify a partial waveform for each rotation of the photosensitive drum 311 from the target waveform. The method of specifying the partial waveform by the control unit 110 may be a known method or a method to be developed in the future. After identifying the partial waveforms, the control unit 110 calculates, as a determination value, the maximum variation width of the latest partial waveform in the identified partial waveforms. This is because the photosensitive layer of the photosensitive drum 311 becomes thinner as the photosensitive drum 311 is rotated. For convenience of explanation, the maximum variation width of the partial waveform will be referred to as the maximum variation width of the target waveform. Instead of a configuration that calculates the maximum variation width of the target waveform as the determination value, the control unit 110 may be configured to calculate, as the determination value, the variance of the target waveform, the average value of the variation width of the target waveform, and the like.

Then, the control unit 110 determines whether there is an abnormality in the photosensitive drum 311 based on the determination value calculated in ACT 180 (ACT 190). In FIG. 6, the process of ACT 190 is indicated by "IS THERE ABNORMALITY?" For example, if the control unit 110 determines that the determination value is equal to or greater than a predetermined threshold value Th, the control unit 110 determines that there is an abnormality in the photosensitve drum 311. On the other hand, for example, if the control unit 110 determines that the determination value is less than the threshold value Th, the control unit 110 determines that no abnormality in the there is photosensitive drum 311. The control unit 110 may be configured to determine whether there is an abnormality in the photosensitive drum 311 by another method based on the determination value.

If the control unit 110 determines that there is no abnormality in the photosensitive drum 311 (ACT190—NO), the control unit 110 ends the process of the flowchart shown in FIG. 6.

On the other hand, if the control unit 110 determines that there is an abnormality in the photosensitive drum 311 (ACT190—YES), the control unit 110 performs predetermined process in times of abnormality (ACT200). For example, the process in times of abnormality occurrence is a process including some or all of a process of displaying abnormality occurrence information indicating that there is an abnormality in the photosensitive drum 311 on the display unit of the control panel 12, a process of transmitting the abnormality occurrence information to the information process device, and the like. The process of displaying the abnormality occurrence information indicating that there is an abnormality in the photosensitive drum 311 on the display unit of the control panel 12 may be a process of displaying the abnormality occurrence information on another display device connected to the image forming apparatus 1. For example, the information process device is a PC owned by a maintenance company of the image forming apparatus 1, a PC owned by the manufacturer of the image forming apparatus 1, or the like, but is not limited to these. After performing the process in times of abnormality in ACT 200, the control unit 110 ends the process of the flowchart shown in FIG. 6. The abnormality occurrence information may be information including text, images, and the like indicating that there is an abnormality in the photosensitive drum 311, but is not limited to these.

As described above, the image forming apparatus 1 detects the resistance detection voltage of the resistor as the voltage for detecting if there is an abnormality in the photosensitive drum 311. Accordingly, the image forming apparatus 1 can accurately determine whether there is an abnormality in the photosensitive drum 311. As a result, the image forming apparatus 1 can promptly notify the occurrence of abnormality in the photosensitive drum 311 if there is an abnormality in the photosensitive drum 311.

Figure 8:
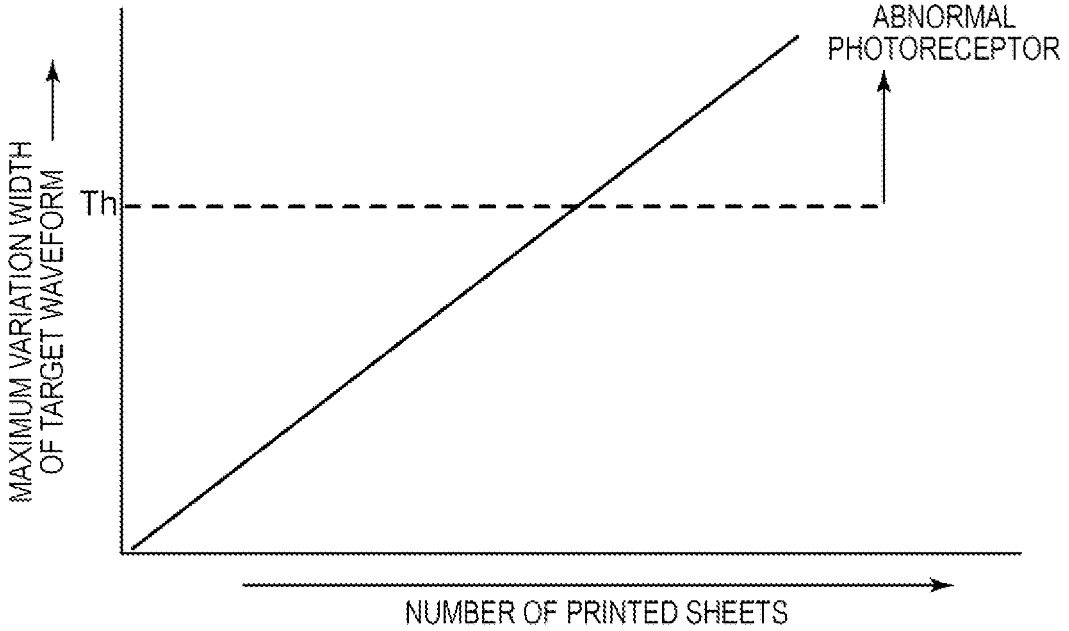
FIG. 8 is a diagram showing an example of a change in a maximum variation width of a target waveform according to increasing number of printed sheets printed by the image forming apparatus.

FIG. 8 is a diagram showing an example of a change in the maximum variation width of the target waveform as the number of printed sheets printed by the image forming apparatus 1 increases. The horizontal axis of the graph shown in FIG. 8 represents the number of printed sheets. The vertical axis of the graph represents the maximum variation width of the target waveform. As shown in FIG. 8, the maximum variation width of the target waveform increases as the number of printed sheets increases. This is because the surface of the photosensitive drum 311 is worn by the charging roller 312 as the image forming apparatus 1 performs printing. However, in FIG. 8, for the sake of simplicity, the change in the maximum variation width of the target waveform accompanying the increase in the number of printed sheets is depicted as linearly changing. It is to be noted that, in reality, the changes in the maximum variation width of the target waveform accompanying the increase in the number of printed sheets do not change linearly, and the changes are fitted by a polynomial. As described above, as shown in FIG. 8, the image forming apparatus 1 uses the maximum variation width of the target waveform as a determination value, and determines that there is an abnormality in the photosensitive drum 311 if the determination value is equal to or greater than the threshold value Th. FIG. 8 is a drawing provided to help visually understand the relationship between the change in the maximum variation width of the target waveform and the threshold value.

The image forming apparatus 1 described above uses a waveform indicating a temporal change in the photosensitive surface voltage as the target waveform, but instead of this, the image forming apparatus 1 may be configured to use a waveform indicating a temporal change in the resistance detection voltage as the target waveform. In this case, the process of ACT 160 is omitted in the flowchart shown in FIG. 6. In this case, in ACT 170 shown in FIG. 6, the control unit 110 detects a waveform indicating a temporal change in the resistance detection voltage as the target waveform.

The control unit 110 described above may be configured to switch the threshold value Th to any one of two or more different values in response to usage history information indicating the usage history of the image forming apparatus 1. For example, the usage history information is any one of information indicating the operating time of the image forming apparatus 1, information indicating the number of times of printing by the image forming apparatus 1, information indicating the number of rotations of the photosensitive drum 311 of the image forming apparatus 1, and the like, but not limited thereto. For example, if the usage history information is information indicating a usage time, the image forming apparatus 1 uses a first threshold value as the threshold value Th for the period of time since the start of using the image forming apparatus 1 until the elapse of a first time, and uses a second threshold value greater than the first threshold value as the threshold value Th for a period of time after the first time elapses since the start of using the image forming apparatus 1. As a result, for example, the image forming apparatus 1 can detect an initial failure of the photosensitive drum 311 using the first threshold value, and can detect that there is an abnormality in the photosensitive drum 311 due to aged deterioration using the second threshold value. For example, the first threshold value is half the second threshold value, but is not limited thereto. For example, the first time is a time of about one month, but is not limited thereto.

A plurality of image forming apparatuses 1 described above may be connected to a server via a network. In this case, the threshold value Th for each of the plurality of image forming apparatuses 1 connected to the server may be optimized by the server. In this case, for example, if the user determines that there is an abnormality in the photosensitive drum 311, each of the plurality of image forming apparatuses 1 outputs, to the server, maximum variation width information indicating the maximum variation width of the target waveform, in response to an operation received from the user. The server stores the acquired maximum variation width information, and calculates the average value of the maximum variation widths based on the stored variation maximum width information. After calculating the average value of the maximum variation widths, the server outputs the average value of the maximum variation widths as the threshold value Th to each of the plurality of image forming apparatuses 1. Each of the plurality of image forming apparatuses 1 sets the threshold value Th acquired from the server as a new threshold value Th. This process may be performed for each model of the image forming apparatus 1. The average value of the maximum variation widths calculated by the server may be the minimum value of the maximum variation width, or may be another value based on the stored maximum variation width information.

The image forming apparatus 1 described above may be configured to perform abnormality determination process for some of the four sets of image forming stations. For example, the image forming apparatus 1 may be configured to perform the abnormality determination process only for the image forming station 34. In this case, the image forming apparatus 1 does not perform the abnormality determination process for each of the image forming stations 31, 32, and 33. This is because the frequency of formation of the K toner image is often higher than the frequency of formation of each of the Y, M, and C toner images, and in this case, it is more likely that there is an abnormality in the photosensitive drum 311 of the image forming station 34. For example, the image forming apparatus 1 may be configured to perform the abnormality determination process for each of the image forming stations 31, 32, and 33. In this case, the image forming apparatus 1 does not perform the abnormality determination process for the image forming station 34. This is because the frequency of formation of each of the Y, M, and C toner images is higher than the frequency of formation of the K toner image. In this case, it is more likely that there is an abnormality in the photosensitive drums 311 of the image forming stations 31, 32, and 33.

The image forming apparatus 1 described above may be configured to perform the abnormality determination process during the pre-rotation of rotating the photosensitive drum 311 before the primary transfer. In this case, for example, the determination condition corresponds to the start of the pre-rotation of rotating the photosensitive drum 311 before the primary transfer, and the like, but is not limited thereto.

The image forming apparatus 1 described above may be configured to perform the abnormality determination process every time a predetermined number of sheets are printed. In this case, for example, the determination condition corresponds to a predetermined number of sheets being printed, and the like, but is not limited thereto. For example, the predetermined number of sheets may be 500 sheets, but may be less than 500 sheets or more than 500 sheets.

The image forming apparatus 1 described above may have a configuration in which a member that is in contact with the photosensitive drum 311 and that includes a constant current source and a detection unit having the same configuration as the constant current source and detection unit DD described above is provided separately from the primary transfer roller 316. In this case, the image forming apparatus 1 may be configured to detect the voltage across the member as the resistance detection voltage. This also allows the image forming apparatus 1 to accurately determine whether there is an abnormality in the photosensitive drum 311 based on the detected resistance detection voltage. In this case, the constant current source provided in the member may be configured integrally with the constant current source provided in the primary transfer roller 316. In this case, the detection unit provided on the member may be configured integrally with the detection unit DD provided on the primary transfer roller 316. The member may be an existing member included in the image forming apparatus 1 or a member newly provided in the image forming apparatus 1.

The image forming apparatus 1 described above may be configured to directly transfer the toner image from the primary transfer roller 316 onto the print medium. For example, such a configuration is adopted if the image forming apparatus 1 is an image forming apparatus that performs monochromatic printing. In this case, the image forming apparatus 1 does not include the intermediate transfer belt 20, and includes a transfer roller configured to directly transfer the toner image onto the print medium, instead of the primary transfer roller 316 configured to transfer the toner image onto the intermediate transfer belt 20. Therefore, the detection unit DD of the image forming apparatus 1 detects the resistance detection voltage used for detecting the resistance value of the resistor using the transfer roller as one resistor. In other words, in this case, the image forming apparatus 1 detects the resistance detection voltage of the transfer roller, and determines whether there is an abnormality in the photosensitive drum 311 based on the detected resistance detection voltage. This also allows the image forming apparatus 1 to accurately determine whether there is an abnormality in the photosensitive drum 311 based on the detected resistance detection voltage.

As described above, the image forming apparatus according to the embodiment (the image forming apparatus 1 in the example described above) includes an image bearing member (the photosensitive drum 311 in the example described above), a charging roller (the charging roller 312 in the example described above) configured to charge the image bearing member, an exposure unit (the exposure scanning head 313 in the example described above) configured to form an electrostatic latent image on the surface of the image bearing member, a developing device (the developing device 314 in the example described above) configured to develop the electrostatic latent image formed on the surface of the image bearing member into a toner image, a transfer roller (the primary transfer roller 316 in the example described above) configured to transfer the toner image from the image bearing member, and a control unit (the control unit 110 in the example described above) configured to detect a resistance detection voltage of the transfer roller as a voltage for detecting that there is an abnormality in the image bearing member. As a result, the image forming apparatus can accurately determine that there is an abnormality in the image bearing member.

The image forming apparatus further includes a transfer belt (the intermediate transfer belt 20 in the example described above) onto which the toner image developed on the surface of the image bearing member is transferred, and the transfer roller is a primary transfer roller that faces the image bearing member across the transfer belt and transfers the toner image from the image bearing member onto the transfer belt.

A configuration may be implemented, in which the image forming apparatus includes a detection unit (the detection unit DD in the example described above) configured to detect the resistance detection voltage, and the control unit determines whether or not there is an abnormality in the image bearing member based on the detected resistance detection voltage.

In the image forming apparatus, a configuration may be implemented, in which the control unit detects a waveform (in the example explained above, the target waveform) in response to a temporal change in the resistance detection voltage for each rotation of the image bearing member, and determines whether or not there is an abnormality in the image bearing member based on the detected waveform.

In the image forming apparatus, a configuration may be implemented, in which the control unit calculates a determination value (the maximum variation width of the target waveform in the example described above) based on the detected waveform, and if it is determined that the calculated determination value is equal to or greater than the threshold value (the threshold value Th in the example described above), the control unit determines that there is an abnormality in the image bearing member.

In the image forming apparatus, a configuration may be implemented, in which the control unit switches the threshold to any one of two or more different values (the first threshold and the second threshold in the example described above) in response to usage history information indicating the usage history of the image forming apparatus.

In the image forming apparatus, a configuration may be implemented, in which the control unit calculates the maximum amplitude value of the detected waveform (the maximum variation width of the target waveform in the example described above) as the determination value.

In the image forming apparatus, a configuration may be implemented, in which, if it is determined that there is an abnormality in the image bearing member, the control unit performs a predetermined process in times of abnormality.

In the image forming apparatus, a configuration may be implemented, in which the process in times of abnormality includes at least one of a process of displaying abnormality occurrence information indicating that there is an abnormality in the image bearing member on the display unit (the display unit of the control panel 12 in the example described above), and a process of transmitting the abnormality occurrence information to the information process device.

In an image forming apparatus, a configuration may be implemented, in which the usage history information is any one of information indicating a usage time of the image forming apparatus, information indicating the number of times of printing by the image forming apparatus, and information indicating the number of rotations of the image bearing member.

An image forming apparatus includes an image bearing member, a charging roller configured to charge the image bearing member, an exposure unit configured to form an electrostatic latent image on a surface of the image bearing member, a developing device configured to develop the electrostatic latent image formed on the surface of the image bearing member into a toner image, a transfer belt onto which the toner image developed on the surface of the image bearing member is transferred, a primary transfer roller facing the image bearing member with the transfer belt interposed therebetween, and a control unit configured to detect a resistance detection voltage of the transfer belt as a voltage for detecting that there is an abnormality in the image bearing member. As a result, the image forming apparatus can accurately determine that there is an abnormality in the image bearing member.

While certain embodiments have been described, these embodiments have been presented by way of example only, and are not intended to limit the scope of the disclosure. Indeed, these embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosures.

A program for realizing functions of any component in the apparatus (e.g., the image forming apparatus 1) described above may be recorded in a computer-readable recording medium, and the program is read and executed by a computer system. It is to be noted that, the term “computer system” as used herein includes hardware such as an operating system (OS) and peripheral devices. In addition, the “computer-readable recording medium” refers to portable media such as flexible disks, magneto-optical disks, ROM, Compact Disk (CD)-ROM, and storage devices such as hard disks embedded into computer systems. Further, the “computer-readable recording medium” includes those that retain programs for a certain period of time, such as volatile memory (RAM) inside a computer system that acts as a server or client if programs are transmitted via networks such as the Internet or communication lines such as telephone lines.

The program described above may be transmitted from a computer system storing this program in a storage device or the like to another computer system via a transmission medium or by a transmission wave in a transmission medium. Here, the "transmission medium" for transmitting the program refers to a medium having a function of transmitting information, such as a network (communication network) such as the Internet or a communication line (communication line) such as a telephone line.

In addition, the program described above may be a program provided to implement part of the functions described above. Furthermore, the program described above may be a so-called difference file (difference program) that can implement the functions described above in combination with a program already recorded in the computer system.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
- an image bearing member;
- a charging roller configured to charge the image bearing member;
- an exposure component configured to form an electrostatic latent image on a surface of the image bearing member;
- a developing device configured to develop the electrostatic latent image formed on the surface of the image bearing member into a toner image;
- a transfer roller configured to transfer a toner image from the image bearing member;
- a controller configured to detect a resistance detection voltage of the transfer roller as a voltage for indicating that an abnormality exists in the image bearing member; and
- a detector configured to detect the resistance detection voltage, resulting in a detected resistance detection voltage,
- wherein the controller is further configured to:
  - determine whether or not the abnormality exists in the image bearing member based on the detected resistance detection voltage,
  - detect a waveform corresponding to a temporal change in the resistance detection voltage for each rotation of the image bearing member, resulting in a detected waveform, and
  - determine whether or not the abnormality exists in the image bearing member based on the detected waveform.

2. The image forming apparatus according to claim 1, further comprising:
- a transfer belt onto which the toner image developed on the surface of the image bearing member is transferred,
- wherein the transfer roller is a primary transfer roller that faces the image bearing member across the transfer belt and transfers the toner image from the image bearing member onto the transfer belt.

3. The image forming apparatus according to claim 1, wherein the controller calculates a determination value based on the detected waveform, and determines that the abnormality exists in the image bearing member when determining that the calculated determination value is equal to or greater than a threshold value.

4. The image forming apparatus according to claim 3, wherein the controller switches the threshold value to one of two or more values different from each other, in response to usage history information indicating a usage history of the image forming apparatus.

5. The image forming apparatus according to claim 3, wherein the controller calculates a maximum value of an amplitude of the detected waveform as the determination value.

6. The image forming apparatus according to claim 1, wherein, when determining that the abnormality exists in the image bearing member, the controller performs a predetermined process in times of abnormality.

7. The image forming apparatus according to claim 6, wherein the process in times of abnormality includes at least one of a process of displaying abnormality occurrence information indicating that the abnormality exists in the image bearing member on a display, and a process of transmitting the abnormality occurrence information to an information process device.

8. The image forming apparatus according to claim 4, wherein the usage history information is any one of information indicating a usage time of the image forming apparatus, information indicating a number of times of printing of the image forming apparatus, and information indicating a number of rotations of the image bearing member.

9. An image forming apparatus, comprising:
- an image bearing member;
- a charging roller configured to charge the image bearing member;
- an exposure component configured to form an electrostatic latent image on a surface of the image bearing member;
- a developing device configured to develop the electrostatic latent image formed on the surface of the image bearing member into a toner image;
- a transfer belt onto which the toner image developed on the surface of the image bearing member is transferred;
- a primary transfer roller facing the image bearing member with the transfer belt interposed therebetween;
- a detector configured to detect a resistance detection voltage of the transfer belt as a voltage for indicating that an abnormality exists in the image bearing member, resulting in a detected resistance detection voltage; and
- a controller configured to:
  - determine whether or not the abnormality exists in the image bearing member based on the detected resistance detection voltage,
  - detect a waveform corresponding to a temporal change in the resistance detection voltage for each rotation of the image bearing member, resulting in a detected waveform, and
  - determine whether or not the abnormality exists in the image bearing member based on the detected waveform.

10. A method for an image forming apparatus, comprising:
- charging an image bearing member with a charging roller;
- forming an electrostatic latent image on a surface of the image bearing member;
- developing the electrostatic latent image formed on the surface of the image bearing member into a toner image;
- transferring a toner image from the image bearing member with a transfer roller;

detecting a resistance detection voltage of the transfer roller as a voltage for indicating that an abnormality exists in the image bearing member, resulting in a detected resistance detection voltage;

determining whether or not the abnormality exists in the image bearing member based on the detected resistance detection voltage;

detecting a waveform corresponding to a temporal change in the resistance detection voltage for each rotation of the image bearing member, resulting in a detected waveform; and determining whether or not the abnormality exists in the image bearing member based on the detected waveform.

11. The method according to claim 10, further comprising:

transferring a toner image to a transfer belt, wherein the transfer roller is a primary transfer roller that faces the image bearing member across the transfer belt and transfers the toner image from the image bearing member onto the transfer belt.

12. The method according to claim 10, further comprising:

calculating a determination value based on the detected waveform, and determining that the abnormality exists in the image bearing member when determining that the calculated determination value is equal to or greater than a threshold value.

13. The method according to claim 12, further comprising:

switching the threshold value to one of two or more values different from each other, in response to usage history information indicating a usage history of the image forming apparatus.

14. The method according to claim 12, further comprising:

calculating a maximum value of an amplitude of the detected waveform as the determination value.

15. The method according to claim 10, further comprising:

when determining that the abnormality exists in the image bearing member, performing a predetermined process in times of abnormality.

16. The method according to claim 13, wherein the usage history information is any one of information indicating a usage time of the image forming apparatus, information indicating a number of times of printing of the image forming apparatus, and information indicating a number of rotations of the image bearing member.

17. The image forming apparatus according to claim 9, further comprising:

a transfer belt onto which the toner image developed on the surface of the image bearing member is transferred, wherein the transfer roller is a primary transfer roller that faces the image bearing member across the transfer belt and transfers the toner image from the image bearing member onto the transfer belt.

18. The image forming apparatus according to claim 9, further comprising:

wherein the controller calculates a determination value based on the detected waveform, and determines that the abnormality exists in the image bearing member when determining that the calculated determination value is equal to or greater than a threshold value.

19. The image forming apparatus according to claim 18, wherein the controller switches the threshold value to one of two or more values different from each other, in response to usage history information indicating a usage history of the image forming apparatus.

20. The image forming apparatus according to claim 18, wherein the controller calculates a maximum value of an amplitude of the detected waveform as the determination value.

21. The image forming apparatus according to claim 9, wherein, when determining that the abnormality exists in the image bearing member, the controller performs a predetermined process in times of abnormality.

22. The image forming apparatus according to claim 21, wherein the process in times of abnormality includes at least one of a process of displaying abnormality occurrence information indicating that the abnormality exists in the image bearing member on a display, and a process of transmitting the abnormality occurrence information to an information process device.

23. The image forming apparatus according to claim 19, wherein the process in times of abnormality includes at least one of a process of displaying abnormality occurrence information indicating that the abnormality exists in the image bearing member on a display, and a process of transmitting the abnormality occurrence information to an information process device.

* * * * *